(12) United States Patent
Ehrman

(10) Patent No.: US 7,101,581 B2
(45) Date of Patent: Sep. 5, 2006

(54) FOOD PRODUCT AND RELATED METHOD

(75) Inventor: Richard A. Ehrman, Malibu, CA (US)

(73) Assignee: The Trustees of the Hildale Trust, Los Angeles, CA (US)

( * ) Notice: Subject to any disclaimer, the term of this patent is extended or adjusted under 35 U.S.C. 154(b) by 391 days.

(21) Appl. No.: 10/174,598

(22) Filed: Jun. 19, 2002

(65) Prior Publication Data

US 2002/0197361 A1    Dec. 26, 2002

Related U.S. Application Data

(63) Continuation of application No. 09/308,316, filed as application No. PCT/US99/05505 on Mar. 12, 1999.

(51) Int. Cl.
B65B 11/00    (2006.01)

(52) U.S. Cl. ............ 426/392; 426/811; 426/289; 426/106; 426/385

(58) Field of Classification Search ........... 426/89, 426/93, 96, 102, 103, 106, 125, 127, 410, 426/415, 289, 389, 615, 616, 811, 516, 517, 426/384, 385, 94, 95, 573; 229/87.08; 206/521.2
See application file for complete search history.

(56) References Cited

U.S. PATENT DOCUMENTS

| | | | |
|---|---|---|---|
| 437,323 A | 9/1890 | Ayers | |
| 1,333,967 A * | 3/1920 | Fowler, Jr. et al. | 426/640 |
| 1,510,679 A | 10/1924 | Katzprowsky | 426/102 |
| 1,538,227 A * | 5/1925 | Thunborg | 76/46 |
| 1,949,835 A | 3/1934 | James et al. | |
| 2,005,184 A * | 6/1935 | Forrest | 426/302 |
| 2,084,956 A | 6/1937 | Hessel | |
| 2,256,190 A | 9/1941 | Bowman | |
| 2,358,086 A * | 9/1944 | Mollner et al. | 426/102 |
| 2,517,595 A | 8/1950 | Owens et al. | 426/96 |
| 2,785,075 A * | 3/1957 | Malecki | 426/302 |
| 2,810,652 A * | 10/1957 | Armbruster | 53/408 |
| 2,835,583 A | 5/1958 | Higgins et al. | |
| 2,909,435 A * | 10/1959 | Watters et al. | 426/102 |
| 2,927,029 A | 3/1960 | Long | |
| 3,134,683 A * | 5/1964 | Holahan et al. | 426/639 |
| 3,419,137 A | 12/1968 | Walck, III | 206/364 |
| 3,511,668 A | 5/1970 | Vollink et al. | 426/548 |
| 3,599,859 A | 8/1971 | Maierson | |
| 3,637,398 A * | 1/1972 | Elerath | 426/302 |
| 3,685,734 A | 8/1972 | Paciorek et al. | |
| 3,940,497 A | 2/1976 | Arenson | |
| 4,139,666 A | 2/1979 | Snavely | |
| 4,208,432 A | 6/1980 | Noborio et al. | |
| 4,487,801 A | 12/1984 | Turnbull et al. | |
| 4,606,956 A | 8/1986 | Charbonneau et al. | |
| 4,717,017 A | 1/1988 | Sprinkel, Jr. et al. | |
| 4,720,423 A | 1/1988 | Fraser | |
| 4,744,995 A * | 5/1988 | Robinson | 426/454 |
| 4,817,860 A | 4/1989 | Shapiro | |
| 4,848,929 A | 7/1989 | Rawl | |
| 4,880,645 A | 11/1989 | Carpenter et al. | 426/89 |
| 4,961,943 A * | 10/1990 | Blanthorn et al. | 426/102 |
| 5,249,676 A | 10/1993 | Ashcraft et al. | |
| 5,258,187 A | 11/1993 | Shimada | |
| 5,284,667 A | 2/1994 | Zimmermann et al. | |
| 5,395,047 A | 3/1995 | Pendergrass, Jr. | |
| 5,554,406 A * | 9/1996 | Muenz et al. | 426/573 |
| 5,569,683 A | 10/1996 | Bootman et al. | |
| 5,626,893 A | 5/1997 | Reddy | |
| 5,711,984 A | 1/1998 | Woodward et al. | 426/640 |
| 5,718,931 A | 2/1998 | Walter et al. | 426/102 |
| 5,846,588 A | 12/1998 | Zimmerman et al. | 426/420 |

(Continued)

FOREIGN PATENT DOCUMENTS

| | | | |
|---|---|---|---|
| FR | 2612743 A * | 9/1988 | |
| JP | 55-096054 A | 7/1980 | |
| JP | 63-2573 A | 1/1988 | |
| JP | 55096054 A2 | 7/1988 | |
| JP | 63169953 A * | 7/1988 | |
| JP | 2286050 A2 | 1/1990 | |
| JP | 2-286050 A | 11/1990 | |
| JP | 05304901 A * | 11/1993 | |
| WO | WO 8912407 A1 * | 12/1989 | |

OTHER PUBLICATIONS

International Search Report mailed Jun. 28, 1999, PCT/US99/05505.

*Primary Examiner*—Keith Hendricks
*Assistant Examiner*—Kelly Mahafkey
(74) *Attorney, Agent, or Firm*—Stetina Brunda Garred & Brucker

(57) ABSTRACT

A food product and related method is provided in which the product is prepared in a manner that allows for optimum removal of food for consumption while retaining the delectable taste of the food and the overall easy storage and disposal of the food product. The food product includes a wrapper that contains a food item having a primary fruit substance and a release agent that is associated with the outer surface of the food item such that it substantially prevents the wrapper from adhering to the food item as the wrapper is removed from the food item. Consequently, the wrapper can be removed from the food item without a portion of the wrapper clinging or sticking to the food item and without any portion of the wrapper tearing away from the body of the wrapper and attaching itself as a remnant to the food item. Thus, the consumer does not have to contend with the tediousness of detaching the wrapper from the food item or the messy experience of sticky hands. The food item is made by a method that includes extruding a fruit substance so as to form the food item and then coating the food item with a release agent that substantially prevents the wrapper from adhering to the food item as the wrapper is removed from the food item. The coating is in turn effectuated by a freeze drying process. Alternatively, in lieu of coating the food item with the outer surface of the food item with a release agent, the method includes baking the outer surface of the food item as to provide an anti-stick barrier.

4 Claims, 3 Drawing Sheets

U.S. PATENT DOCUMENTS

| | | | |
|---|---|---|---|
| 5,853,778 A | 12/1998 | Mayfield | 426/89 |
| 5,858,487 A | 1/1999 | Boehler et al. | |
| 5,938,018 A | 8/1999 | Keaveney et al. | |
| 6,027,758 A * | 2/2000 | McHugh et al. | 426/615 |

* cited by examiner

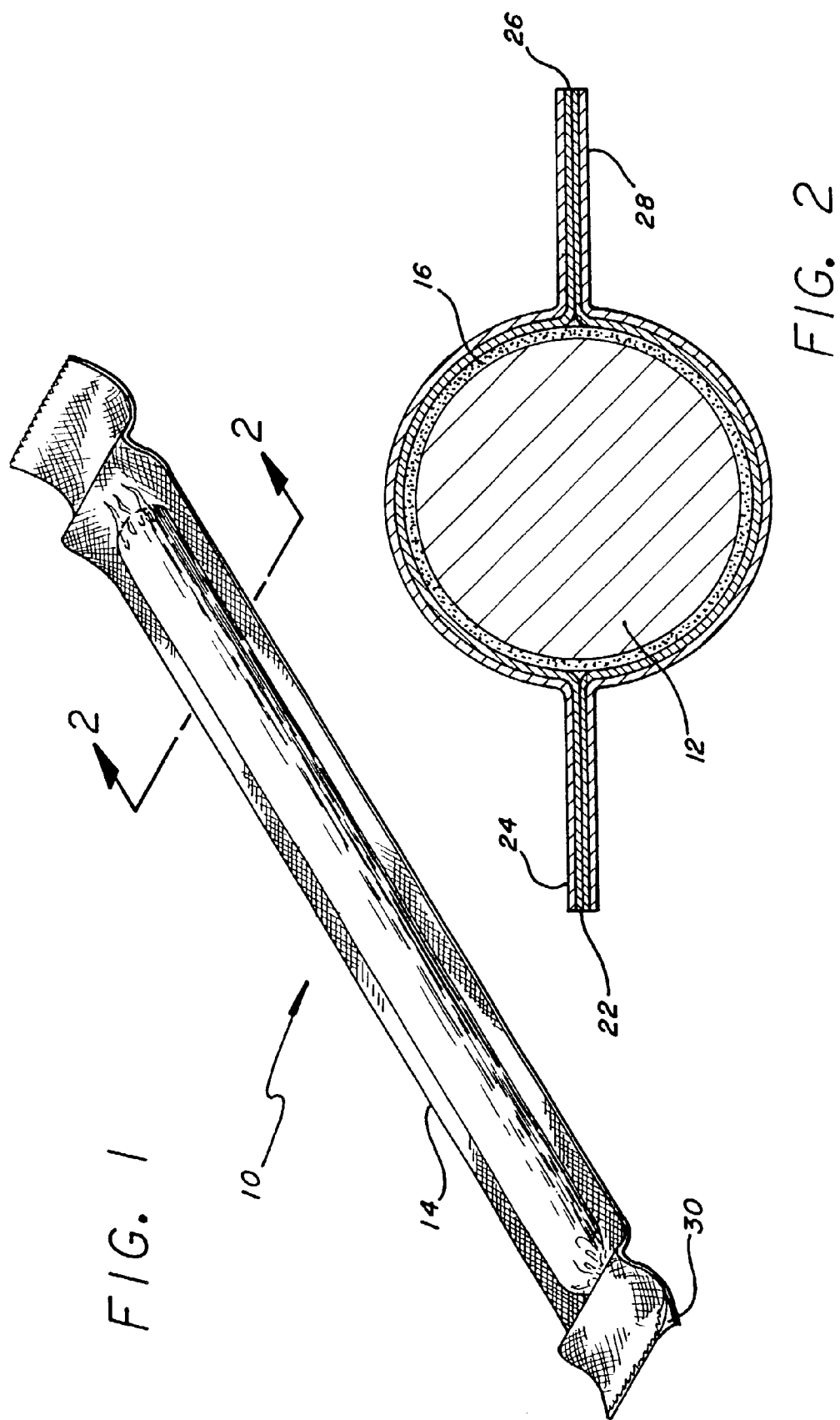

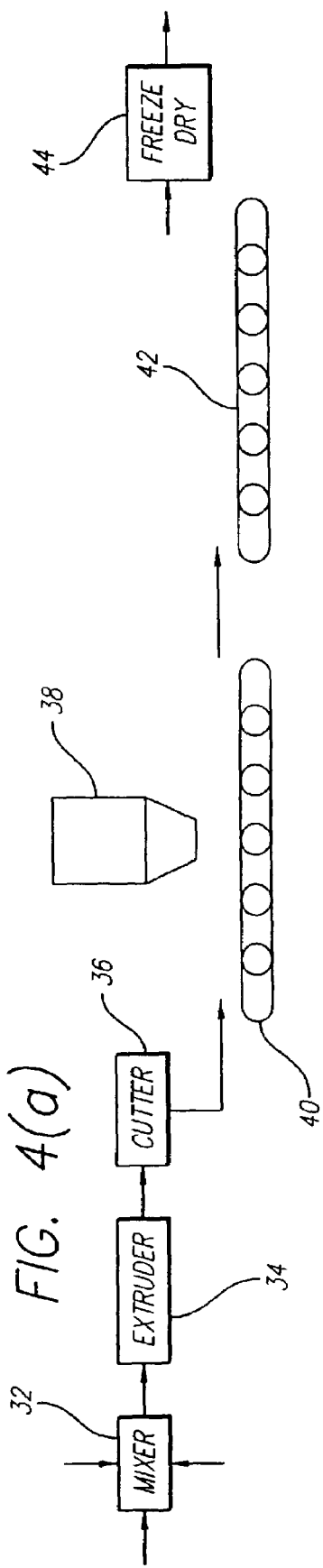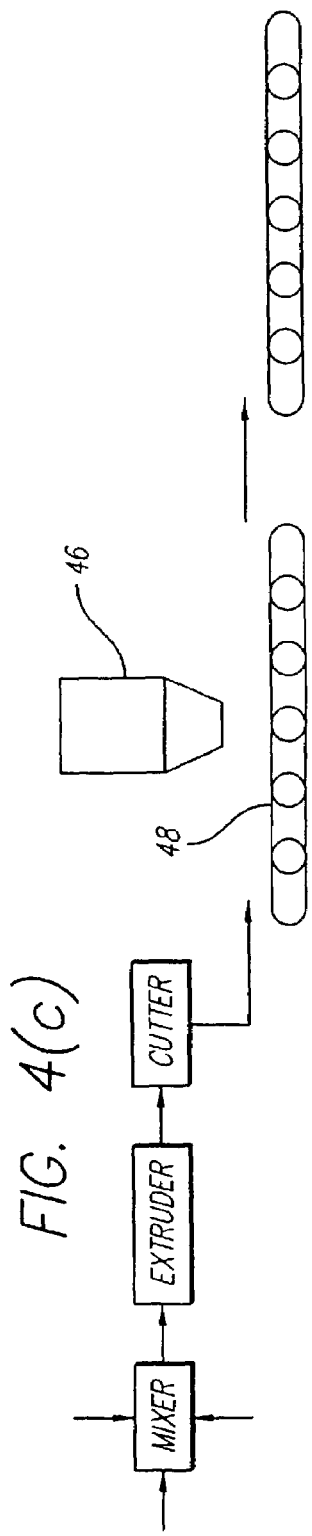

FOOD PRODUCT AND RELATED METHOD

This application is a continuation of U.S. Application No. 09/308,316 filed Jul. 22, 1999, now abandoned, which is the US national stage entry of International application PCT/US99/05505 filed Mar. 12,1999.

BACKGROUND OF THE INVENTION

The present invention relates to food products and methods and, more particularly, to snack food products and related methods.

Snack foods are a staple part of the public's diet. Indeed, a not insubstantial amount of the public has displayed a penchant for "grazing" on small amounts of food throughout the day in lieu of eating regular meals. Not surprisingly, these conditions have fostered a burgeoning demand for a greater variety of snack foods, including snack foods such as fruit based snacks, that at least arguably have better nutritional value than certain other types of snack foods. Moreover, there remains considerable demand for snack foods that have a relatively long shelf life, are fit for immediate consumption, and are compactly packaged for easy storage and disposal. To this end, snack food products often contain snack foods that are wrapped in relatively compact wrappers which may only contain a few items of snack food or even only one "bite sized" item.

Pre-existing snack food products do, however, have drawbacks in terms of their suitability for immediate consumption, especially over the useful shelf life of the snack food. Specifically, various snack food products tend to be made in a manner that makes the snack food unacceptably messy to remove from its wrapper and consume. This is especially troublesome when one considers the wide variety of different environmental conditions that a snack food is ordinarily exposed to over a period of time. By way of example, a fruit-based snack food, typically has a tendency to undesirably adhere to its wrapper as the wrapper is removed from the snack food. Consequently, a portion of the wrapper may cling or stick to the snack food or the portion may even tear away from the body of the wrapper so as to leave a remnant attached to the snack food. The consumer then may experience sticky hands in attempting to remove the wrapper, not to mention the tediousness and overall messy experience associated with removing the wrapper. The frustrated consumer may also ultimately discard some or all of the snack food, thereby wasting otherwise edible food.

Accordingly, it should be appreciated that there is a definite need for a more consumer-friendly food product in which the consumer can relatively effortlessly remove the product from the wrapper and avoid having to deal with the unpleasantness of sticky hands and the unfortunate waste of the food product.

SUMMARY OF THE INVENTION

The present invention, which addresses this need, is embodied in a food product and related method that is prepared in a manner that allows for optimum removal of food for consumption while retaining the delectable taste of the food and the overall easy storage and disposal of the food product.

The food product includes a wrapper that contains a food item having a primary fruit substance and a release agent that is associated with the outer surface of the food item such that it substantially prevents the wrapper from adhering to the food item as the wrapper is removed from the food item. Consequently, the wrapper can be removed from the food item without a portion of the wrapper clinging or sticking to the food item and without any portion of the wrapper tearing away from the body of the wrapper and attaching itself as a remnant to the food item. Thus, the consumer does not have to contend with the tediousness of detaching the wrapper from the food item or the messy experience of sticky hands.

In more detailed aspects of the invention, the wrapper includes first and second opposing segments that together form a peelable seal around the food item. Further, the first segment has an inner layer of polyethylene connected to an outer layer of polyester, while the second segment has an inner layer of polyethylene connected to an outer layer of a thermally formable material, such as nylon. Moreover, the release agent is one or more fruit powders or a composition that includes a fruit powder and a flour and the release agent further coats the outer surface of the food item. As an alternative to a fruit based release agent, an appropriate natural or synthetic oil, such as MIGLYOL 812, coats the outer surface of the food item. As still another alternative, in lieu of the release agent, the food item is characterized by a baked outer surface that provides an anti-stick barrier which substantially prevents the wrapper from adhering to the food item as the wrapper is removed from the food item.

In other detailed aspects of the invention, the food item is made by a method that includes extruding a fruit substance so as to form the food item and then coating the food item with a release agent that substantially prevents the wrapper from adhering to the food item as the wrapper is removed from the food item. The coating is in turn effectuated by a freeze drying process. Alternatively, in lieu of coating the food item with the outer surface of the food item with a release agent, the method includes baking the outer surface of the food item as to provide the aforementioned anti-stick barrier.

Other features and advantages of the present invention should become more apparent from the following description of the preferred embodiments, taken in conjunction with the accompanying drawings, which illustrate, by way of example, the principles of the invention.

BRIEF DESCRIPTION OF THE DRAWINGS

In the accompanying illustrative drawings:

FIG. 1 is a perspective view of the food product of the present invention.

FIG. 2 is an enlarged side cross-sectional view of the food product, taken substantially along lines 2—2 in FIG. 1.

FIGS. 4(*a*) and (*b*) and (*c*) are process flow diagrams, each depicting a procedure for making the food product.

DETAILED DESCRIPTION OF THE PREFERRED EMBODIMENTS

Figure 3:
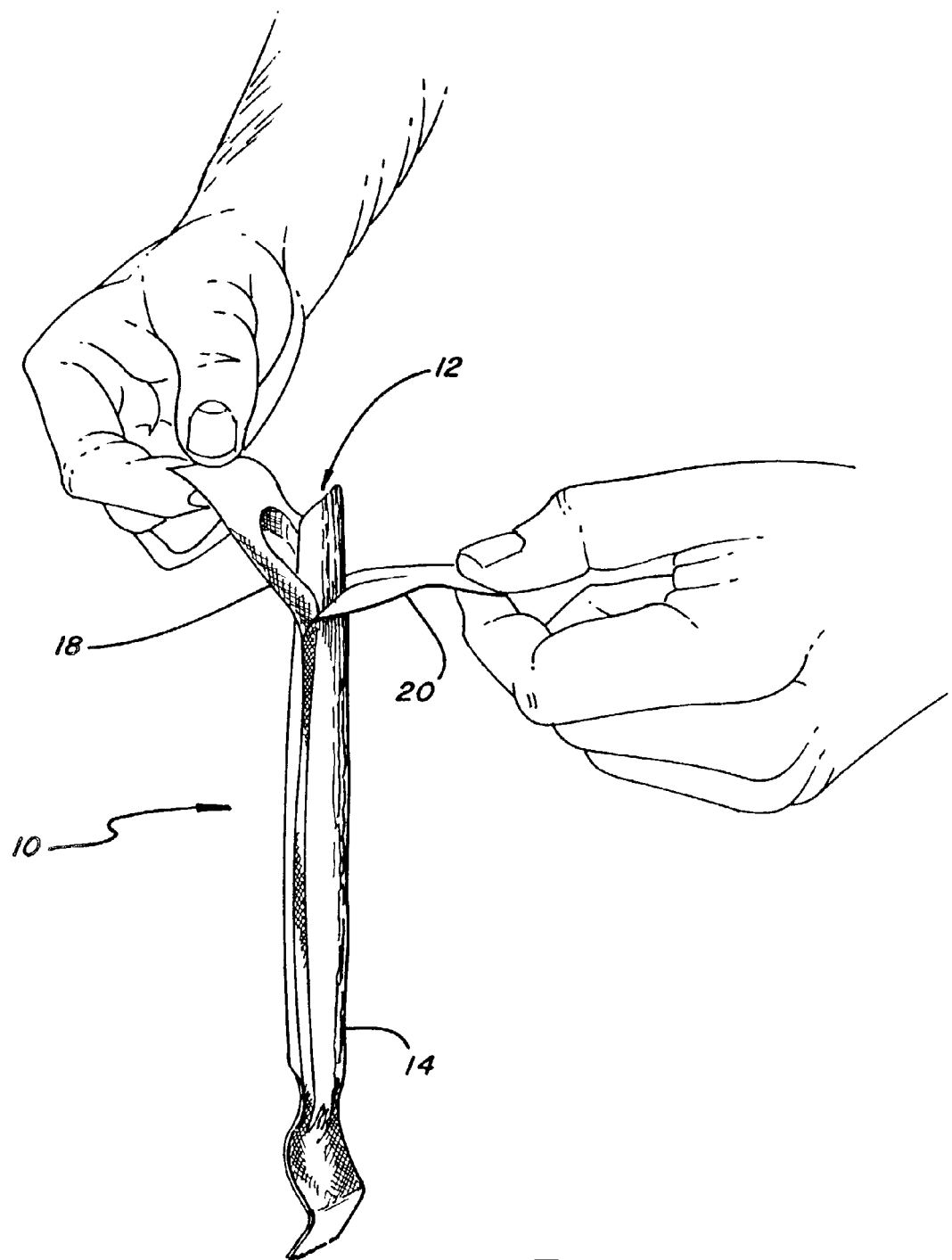
FIG. 3 is a perspective view showing the food product of FIG. 1 as partially opened by the consumer at its flap.

With reference now to the exemplary drawings, and particularly to FIGS. 1-3, there is shown a food product 10 which includes a food item 12 that is snugly contained within a wrapper 14 and has a release agent 16 situated between the food and the wrapper. While it can be one or more of a variety of edible materials, the food item is preferably a fruit substance that is sufficient in quantity to constitute a snack for the consumer. In the case of a fruit substance, the ingredients of the food item include principally dried fruit and natural or artificial food coloring, natural or artificial flavors and, optionally, sweeteners and natural or artificial preservatives. Typical natural preservatives are citric acid or lemon juice, and conventional artificial preservatives include potassium sorbates, sodium benzoate, and other appropriate preservatives that retard or prevent spoilage of the fruit substance. Additionally, the fruit substance preferably, but not necessarily, includes suitable grains, flours or starches or combinations thereof, such as rice flour or a rice based composition.

The food item 12 is formed by a conventional mixing and extrusion process utilizing mixing and extrusion equipment 32 and 34 that is common in the food industry, such as Vemag extrusion equipment available from Robert Reiser & Co., Inc. of Canton, Mass., and thereby assumes the familiar tubular shape. After the extrusion process, a suitable cutter 36 may also be used to cut appropriately sized food items as shown in FIG. 4. In this regard, where a fruit substance serves as the food item, the fruit is dried fruit, such as apples, dates, apricots, cherries, grapes and strawberries, and advantageously has a moisture content of about 16% to about 25% by weight. Once a particular fruit is selected, one can select one or more natural or artificial flavorings, sweeteners and colors that enhance or complement the taste of the fruit. Moreover, for a fruit substance, the dried fruit and other ingredients are mixed together and extruded at room temperature (i.e., about 65 to about 70° F.).

The wrapper 14 includes two segments 18 and 20 that are together particularly adapted for containment of the food item 12 and relatively easy access to the food item. The wrapper 14 is also advantageously made of a suitable material which snugly contains the food item 12 and facilitates prompt and easy removal of the food item from the wrapper when consumption is desired. To this end, as shown in FIGS. 2–3, two segments 18 and 20 are joined together around the food item by utilizing conventional thermal pressurization and seal food packing equipment, such as thermal form and fill machines available from Multivac, Dixie Union, and Tiromat. Specifically, the segment 18 includes an approximately 2.0 mils thick inner layer 22 of high octane, linear low density polyethylene ("LLDPE") that is laminated to an about 50 gauge polyester outer layer 24 made of polyester or a biaxially oriented polypropylene. Further, an oxygen barrier coating, such as that available under the trademark Saran, is sandwiched between the layers 22 and 24 so as to render the segment 18 less permeable. The segment 20 in turn includes a similar inner layer of LLDPE 26 and an about 5.0 mils thick outer layer 28 of a suitable thermally formable material, such as nylon or cast polypropolene. The use of such an outer layer 28 for segment 20 helps ensure that the wrapper will closely conform to the shape of the food item. Correspondingly, the outer layer 24 provides for better adhesive and sealing characteristics for the wrapper 14. Similarly, an oxygen barrier coating, such as evoh, is sandwiched between the layers 26 and 28 to lessen permeability. In lieu of LLDPE, the inner layers 22 and 26 can be made of any other polyethylene or an ionomer that has the requisite sealing characteristics.

As shown in FIGS. 1 and 3, the two segments 18 and 20 are peelable and together create a seal that effectively extends around the food item 12, while also defining an opening or flap(s) 30 at the top end of the wrapper 14 above where the seal terminates. This facilitates peeling without prematurely exposing the food item. The snack food product 10 is then opened by grasping the top portion of each segment at the flap and peeling each segment back relative to the other. It will be appreciated that a variety of other materials can be utilized to create a wrapper having suitable sealing and peelability characteristics.

In accordance with another feature of the invention, the release agent 16 is associated with the outer surface of the food item 12 so as to better permit easy removal of the wrapper 14 from the food item and at least substantially prevent any portions of the wrapper from undesirably adhering to the food item while the segments 18 and 20 are peeled away from each other. Consequently, the food item can be removed and consumed without having to individually remove separate portions or remnants of the wrapper from the food item. Moreover, the consumer can also consume the food item without having to contend with sticky hands or an unseemly mess.

The release agent 16 is advantageously a substance that will not detract from the texture and delectable taste of the food item 12, and will provide a barrier between the wrapper 14 and food item 12 that prevents undesirable adherence of the wrapper to the food item during removal of the food item. In this regard, a preferred substance is an appropriate fruit powder or a composition of a fruit powder with a grain or flour, such as rice flour, which effectively coats the food item. Representative examples of such fruit powder include the following, all of which are currently available from Armour Food Company:

| Type | Principle Ingredients | Pertinent Properties |
| --- | --- | --- |
| Spray Dried Concord Grape | Concord grape solids and maltodextrine | moisture: 4.0% maximum pH: 3.4 +/− 0.2 Grape solids: 50% minimum |
| Spray Dried Strawberry Powder | Strawberry solids and maltodextrin | moisture: 4.0% maximum pH: 3.4 +/− 0.2 Fruit solids: 50% maximum |
| Spray Dried Apricot | Apricot puree and, optionally, less than 2% silicon dioxide (anti-caking agent) | moisture: 3.0% maximum granulation: 100% through U.S. #1 |
| Spray Dried Sour Cherry | Sour cherry, juice solids, maltodextrin and, optimally, less than 2% silicon dioxide to prevent caking | moisture: 4.0% maximum pH of 10% solution: 4.0% +/− 0.2 |

A representative example of a grain or flour suitable for combination with any of the aforementioned types of fruit powder is rice flour presently available from California Natural Products of Lathrop, Calif. Such flour typically has a moisture content of about 12% by weight and is relatively finely granulated. Such a combination also preferably yields a composition that is about 40 to about 60% by weight rice flour. The composition can also include more than one type of fruit powder.

The particular type of fruit powder or fruit powders used will partially depend on the type of fruit substance that makes up the food item 12, because this considerably affects the texture and delectability of the food items. Representative examples of the fruit powder(s) used for representative fruit substances are set forth below:

| Fruit Substance Principal Ingredients | Fruit Powder(s) |
| --- | --- |
| 1. Dates, pears, bananas, apricots, natural color and flavor, lemon juice | apricot |
| 2. Dates, pears, bananas, grapes, natural color and flavor, lemon juice | grape |

-continued

| Fruit Substance Principal Ingredients | Fruit Powder(s) |
|---|---|
| 3. Dates, pears, bananas, cherries, natural color and flavor, lemon juice | cherry |
| 4. Dates, pears, bananas, strawberries, natural color and flavor, lemon juice | strawberry |
| 5. Dates, apricots, natural color and flavor, lemon juice | apricot |

It will be appreciated that any number of other fruits or combinations thereof can also be used depending on consumer preference and other well understood factors. For instance, in the first example above, one could substitute apples for dates.

In order to better ensure that the release agent 16 in the form of fruit powder(s) or a composition of fruit powder(s) and grain or flour adequately covers the food item 12, copious amounts of the fruit powder(s) or a composition thereof are applied to the food item 12 via a powder applicator 38 that drops fruit powders vs. aforementioned compositions onto the food item as it passes along a conveyor 40 (see FIG. 4(*a*)). Then, the food item is carried along a vibrating conveyor 42 and is thereafter exposed to a quick freeze drying process in processor 44 such that the fruit powder(s) or composition effectively forms a coating around the outer surface of the food item. Preferably, the freeze drying process occurs at a temperature of about minus 20° F. over a continuous two-minute period for each food item. The freeze drying process not only coats the food item 12, and thereby at least substantially prevents stickiness, but also tends to substantially impede absorption of the release agent 16 into the food item 12 over the course of the useful shelf life of the food product 10. Suitable equipment for carrying out this procedure is a powder applicator available from Accutron and standard food freeze drying equipment such as that available from BOC Gas. The powder applicator typically has a sifter and hopper that gravity-feeds the release agent 16 onto the food items 12 as they pass along the conveyor(See, FIG. 4(*a*)).

By way of an alternative embodiment, as an alternative release agent, the outer surface of the food items may be coated with an appropriate natural or synthetic oil, including the natural oil known as MIGLY0L 812 which is a mixed acid triglyceride of fractionated coconut fatty acids $C_6$–$C_{10}$. In that event, the oil would be spray coated in atomized droplets or a fine mist onto the food items 12 as they pass along conveyor 48 via an oil applicator 46 (See FIG. 4(*c*)).

A further alternative embodiment of the food product will now be described. Specifically, in lieu of the release agent 16, the food product 10 can include the wrapper 14 and food item 12 above. However, in this instance, a special baking process is used to create an outer surface that forms an anti-stick barrier which substantially prevents the wrapper from adhering to the food item as the wrapper is removed from the food items. (See FIG. 4(*c*)). To this end, a suitable convection oven is preferably used that is set at a temperature of about 150 to about 190° F. and thereby slowly bakes the outer surface of the food item over a period of about 20 to about 60 minutes. Moreover, as part of the drying process a substantial flow of air is circulated around the food item. Suitable convection ovens include ovens made by MacTavish Machine Mfg. Co. of Richmond, Va. and Proctor and Schwartz.

Although the invention has been described in detail with reference only to the presently preferred devices and method, those of ordinary skill in the art will appreciate that various modifications can be made without departing from the invention. Accordingly, the invention is defined only by the following claims.

I claim:

1. A method for making a packaged food product comprising the steps:
    a) forming an extruded fruit-based food item;
    b) depositing a powdered release agent about said extruded fruit-based food item of step a), wherein said powder release agent consists only of a fruit powder;
    c) quick freeze drying said powdered release agent deposited about said extruded fruit-based food item such that said powdered release agent effectively forms a coating around the outer surface of said food item;
    d) packaging said food item prepared in step c) in a wrapper formed from at least one layer of polymer material.

2. The method of claim 1 wherein in step b), said fruit powder has a moisture content no greater than 4.0%.

3. The method of claim 1 wherein in step c), said freeze drying occurs at a temperature of about −20° F. for a continuous duration of approximately 2.0 minutes or less.

4. The method of claim 1 wherein in step d), said wrapper comprises the combination of a first segment and a second segment that cooperatively engage one another to encapsulate said food item, said first segment being formed from a first inner layer of polyethylene and a second outer layer of polyester and said second segment being formed from an inner layer of polyethylene and an outer layer of nylon.

\* \* \* \* \*